Aug. 18, 1942.  F. V. WALTZ  2,293,230
TRANSMISSION DEVICE
Filed July 31, 1941  2 Sheets-Sheet 2
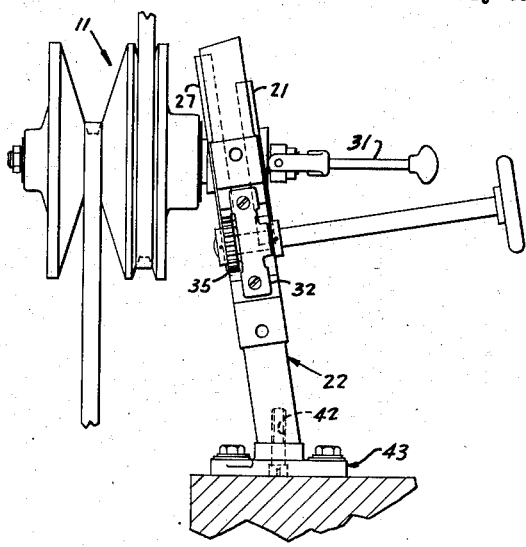
Fig. IV
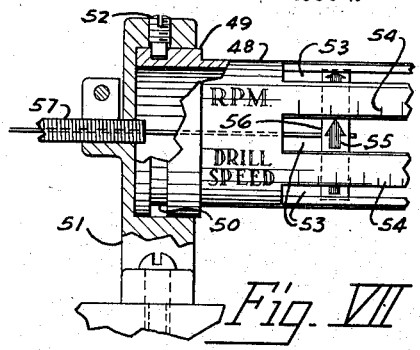
Fig. VII
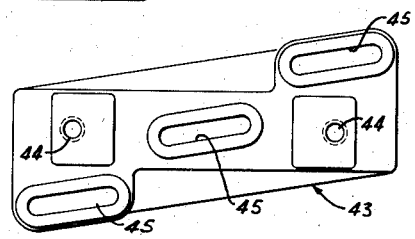
Fig. VIII
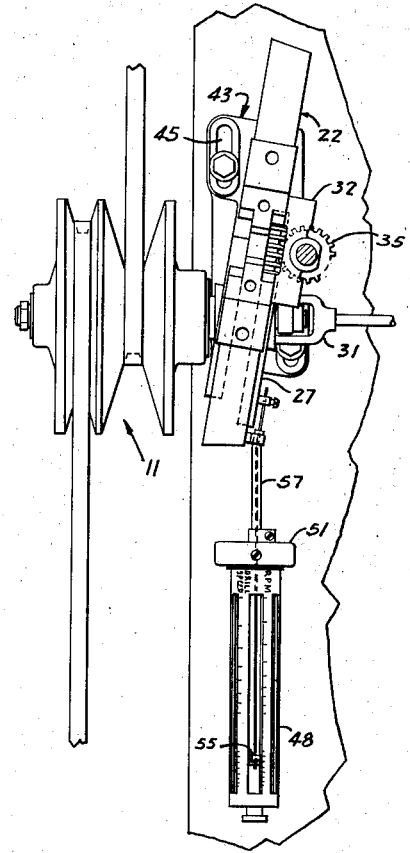
Fig. V
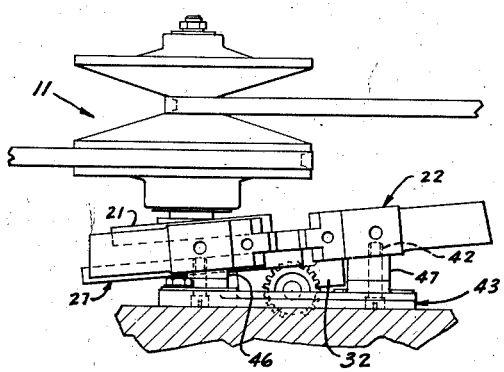
Fig. VI
Foster V. Waltz
INVENTOR
BY Marshall and Marshall
ATTORNEYS Patented Aug. 18, 1942

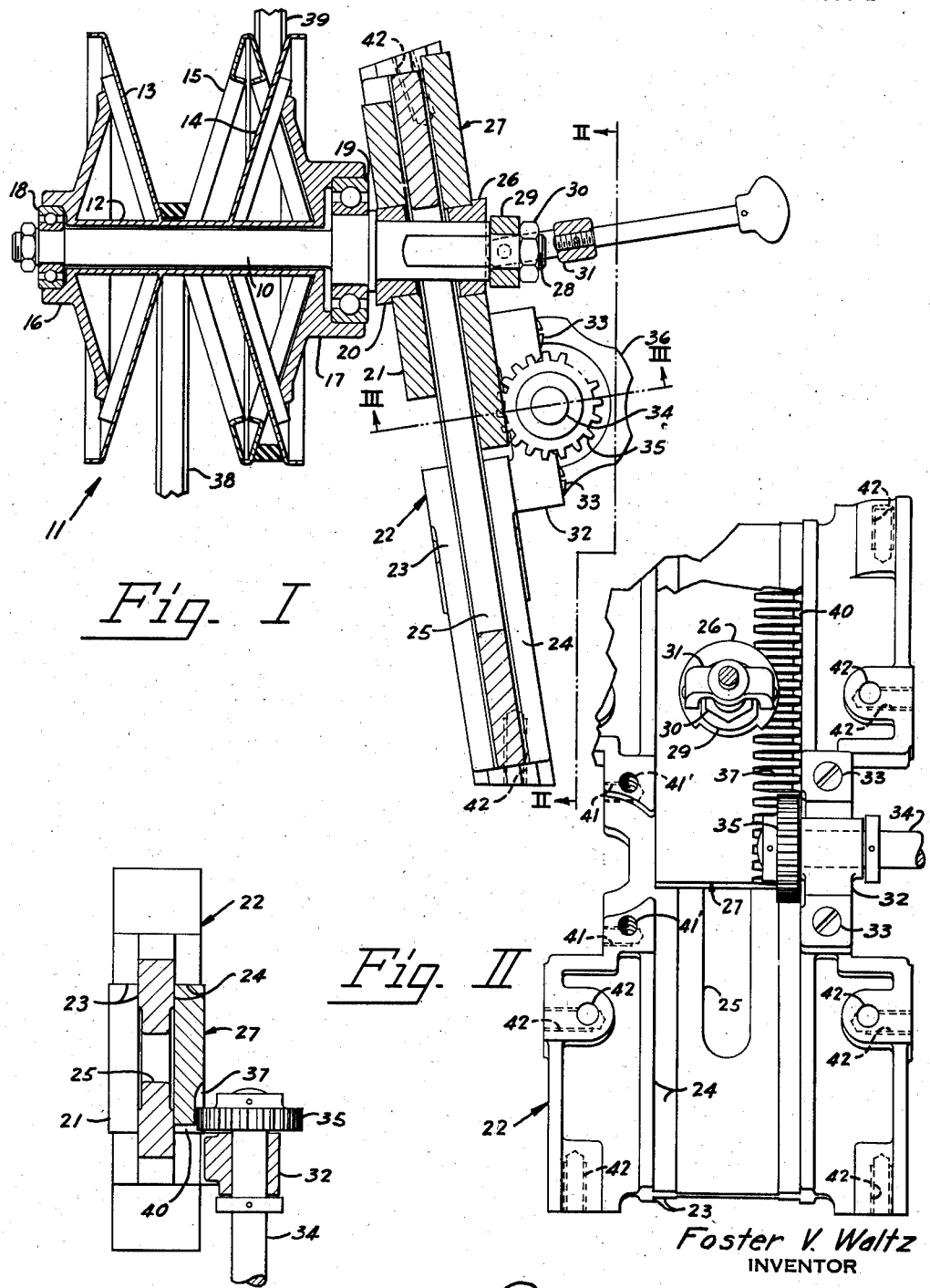

2,293,230

UNITED STATES PATENT OFFICE 2,293,230

TRANSMISSION DEVICE

Foster V. Waltz, Toledo, Ohio

Application July 31, 1941, Serial No. 404,867

12 Claims. (Cl. 74—230.17)

This invention relates to variable speed transmission devices, and more particularly to means for mounting such transmission devices to enable their use in any position relative to the driving machines.

The use of intertelescoping dual sheave pulleys in variable speed transmissions has been somewhat limited, due to the types of mounting brackets which have heretofore been used. It is desirable that such a variable speed transmission be so constructed that it can be used to change the speeds between, for example, a motor and a machine arranged in vertical relationship, horizontal relationship or, as in the case of a drill press, with the central axes of the motor and the machine both vertical and in horizontal spacial relation.

In a variable speed transmission employing a composite dual sheave pulley, the driving belt and driven belt are engaged between the walls of two outer cone-shaped flanges and a central shiftable double cone-shaped flange. The speed of the driven machine is changed by moving the pulley toward or away from the machine. This tightens one or the other of the belts and forces the shiftable double cone-shaped central member to move longitudinally on its axis. The tightened belt then contacts the walls of its V-shaped sheave nearer the axis of rotation and the other belt is moved out from the center. However, when such a lateral shift of the center member takes place, the vertical planes of contact of the belts are moved in the same direction as the center member and the center lines of the belts are no longer at right angles to the axes of the pulley and the driving and driven machines. Therefore the belts do not enter the pulleys cleanly and excessive wear results.

To assure that the belts enter the pulleys cleanly, the composite pulley may be mounted upon a shaft which is translatable at an angle oblique to its axis so that the shift of the belts on the faces of the sheaves will be compensated for by shifting the lateral position of the composite dual sheave pulley.

In order to construct a variable speed transmission which is designed for use in various positions the composite pulley must be so mounted that it will not interfere with the mounting of the transmission as a whole and can be moved obliquely with respect to its axis whether such axis be vertical or horizontal and whether the belts extend from the pulleys vertically or horizontally.

The indication of speed change through the use of such a variable speed transmission has often been accomplished by having a scale marked on a stationary portion of the mechanism and an indicator attached to a sliding portion of the mechanism. Where the speed transmission is of the usual type, and is designed for use with one particular machine, such a speed change indicating scale is satisfactory since the speed on the one machine needs to be shown in only one way; that is, revolutions per minute, or proper speeds for certain drill sizes or ratios of driving to driven speeds. If, however, such a transmission were designed to permit universal mounting and applications to various machines, it would be impossible to mark all of these scales, as well as others which might be interesting, on the body of the mechanism itself.

It is the principal object of this invention to provide a mounting for a variable speed change transmission which will permit the speed change transmission to be used with the line of drive arranged vertically or horizontally, and between two axes arranged either vertically or horizontally, or in either vertical or horizontal spacial relation if horizontally parallel.

It is a further object of this invention to provide a mounting for a variable speed transmission which can be mounted on a horizontal surface or on a vertical surface.

It is another object of this invention to provide a variable speed transmission mounting means which will compensate for the lateral shift of the belt center lines caused by the shifting of the center member of a composite dual sheave intertelescoping pulley, to prevent wear on the belts and to increase their life.

It is another object of this invention to provide a base and mounting bracket for a variable speed change transmission which will enable such transmission to be used with any one of a plurality of various machines;

It is still another object of this invention to provide a speed change transmission capable of use with any one of various machines and having an indexing scale for showing the speed change in various terms.

More specific objects and advantages are apparent from the description, in which reference is had to the accompanying drawings illustrating a preferred form of transmission device embodying the invention.

In the drawings:

Fig. I is a vertical sectional view of a speed change transmission embodying the invention.

Fig. II is a fragmentary view in vertical elevation of the device illustrated in Fig. I, taken on the line II—II of Fig. I.

Fig. III is a horizontal, cross-sectional view, taken on the line III—III of Fig. I, a pinion and shaft being shown in plan.

Fig. IV is a view in elevation on a smaller scale of the device illustrated in Fig. I, showing the operating handle in one of its various positions.

Fig. V is a plan view of the device illustrated in Fig. I, installed in another position, and showing the incorporation therewith of a speed scale.

Fig. VI is a view in elevation of the device shown in Fig. I in still another of its installations.

Fig. VII is a fragmentary detailed view of a portion of the speed scale shown in Fig. V;

Fig. VIII is a plan view of the universal mounting bracket shown in use in Figs. IV, V and VI.

These specific drawings and the specific description that follows merely disclose and illustrate the invention and are not intended to impose limitations upon the claims.

Rotatably mounted upon a shaft 10 is a double sheave pulley 11. The pulley 11 consists of a sleeve 12, concentric with the shaft 10, two outside flanged members 13 and 14, forming the outer surfaces of the sheaves, and a slidable double cone-shaped member 15. The flanged members 13 and 14 are fixedly attached to the sleeve 12 through hubs 16 and 17 respectively.

Ball bearings 18 and 19 are mounted on the shaft 10 and permit the pulley to rotate thereon. The inner end of the shaft 10 extends through an angularly bored, angular faced cylindrical plug 20 which is fitted into a plate 21, which plate is slidable in a channel on one side of a base 22. The base 22 (Fig. III) has a longitudinal channel 23 cut in one of its sides, and a second longitudinal channel 24 cut in its other side. The shaft 10 extends through a slot 25, cut through the base 22 between the channels 23 and 24. A second angularly bored, angular faced cylindrical plug 26 is mounted in a rack plate 27 which is slidable in the channel 24. The shaft 10 extends through this second plug 26 and has a threaded section 28 on which is mounted a collar 29.

The collar 29 is held on the threaded section 28 by means of a retaining nut 30. A forked clamping lever 31 is pivoted near the ends of its forks on the collar 29. The ends of the forks of the clamping lever 31 are cut with a small radius which, when the clamping lever 31 is swung into coaxial relation with the shaft 10, cams against the angular face of the plug 26 and tightens the collar 29 against the retaining nut 30, which squeezes the plugs 20 and 26 together and clamps the plate 21 and the rack plate 27 in the channels 23 and 24.

A bearing bracket 32 is fastened to the base 22, by means of screws 33, and serves to rotatably support a pinion shaft 34. A pinion 35 is fixed on one end of the shaft 34 and a handwheel 36 is fixed to the other end. The pinion 35 is in mesh (Fig. II) with side teeth 37 of the rack plate 27.

The base 22 has the general shape of the frustum of a wedge, with parallel faces and sides and plane surface ends which, if extended, would converge in a line. The sides of the base are trapezoidal in shape, resulting in the ends of the base 22 being at an angle from the vertical (in relation to the faces) equal to approximately one half of the angle which the faces of the member 15 make with a plane at right angles to the axis of the shaft 10. As shown in Fig. I, this angle compensates for the angular boring in the plugs 20 and 26 in order to make the shaft 10 horizontal when the base 22 is mounted on end.

The angular relation between the shaft 10 and the base 22 is necessary to maintain belts 38 and 39 on the same driving line when the member 15 is moved to one side or the other. If the belt 38 is assumed to be the driving belt, and the belt 39 the driven belt, the position of the transmission in Fig. I will result in a low driven speed. If the clamping lever 31 is swung away from coaxial relation with the shaft 10 and the mechanism released, by turning the handwheel 36 in a counterclockwise direction, the rack plate 27 may be moved downwardly carrying the pulley 11 therewith. Increased tension on the belt 39, and a loosening of tension on the belt 38, will force the member 15 to the left, increasing the driving diameter of the pulley and decreasing the driven diameter. This will, of course, increase the speed of the driven machine. If the movement of the pulley 11 were vertical, rather than at the angle determined by the angularly bored plugs 20 and 26 and the angular end of the base 22, the center line of both belts would be shifted to the left. However, since the angle of mounting of the pulley is approximately one quarter the angle of intersection of the faces of the pulley, the pulley is shifted to the right as it is lowered, compensating for the movement of the belt to the left on the flanged members 13 and 14 and maintaining the belts on the same driving line.

In Figs. I, II and III, the bearing bracket 32 is shown mounted on the front of the base 22 with the pinion shaft 34 extending horizontally at right angles to the plane of movement of the shaft 10. The base 22 is constructed with several series of tapped holes spaced to receive the screws 33 through the bearing bracket 32. The rack plate 27 has side teeth 37 and also has teeth 40 in one of its edges. Thus the bearing bracket 32 may be mounted as shown in Figs. I, II and III with the pinion engaging the teeth 37, or may be mounted in holes 41 (Fig. II) with the rack plate 27 reversed in which case the pinion 35 would mesh with the teeth 40. There is a similar set of holes drilled at right angles to those in which the screws 33 are driven in the arrangement shown in Fig. II and another pair of holes 41' is at right angles to the holes 41.

The channels 23 and 24 are of the same width and depth so that the rack plate 27 can be mounted on either side of the base 22.

In Fig. I, the base is shown mounted on end with mounting screws coming up through the table or bench, on which it is mounted, into a pair of holes 42. The base is constructed with similar pairs of mounting holes, having the same center-to-center distances, in both ends, both sides and near both sides on both faces. The pairs of holes 42, bored in the ends of the base, are bored at right angles to the face of the ends. Similarly the pairs of holes 42, bored in the edges of the base, are bored at right angles to those edges. However, the pairs of holes bored in the faces of the base are bored at the same angle as that on which the ends of the base are cut, as can be seen in Fig. VI.

Fig. IV shows the mechanism mounted on end on a mounting bracket 43 which is in turn bolted to the bench or table, on which the machine is mounted. In Fig. IV, the bearing bracket 32 is shown attached to the edge of the base 22 and the rack 35 is in mesh with the teeth 40 in the edge of the rack plate 27. The rack plate 27 is on the opposite side of the base 22 from that on which it is shown in Fig. I.

The mounting bracket 43 (Fig. VIII) has a pair of holes 44 which have the same center-to-center distance as the various pairs of tapped holes 42 in the base 22. The mounting bracket 43 also has three slots 45 with their principal axes at the same angle to the center lines of the holes 44 as that angle at which the shaft 10 is mounted in the base 22.

Fig. V illustrates the mechanism with the base 22 mounted on its edge on the mounting bracket 43. Since the slots in the mounting bracket 43 are to permit adjustment of the speed change mechanism toward and away from the machine and the motor, and since the base 22 must be mounted at an angle to the line of drive of the belts, as can be seen in Fig. V, the slots 45 must be constructed at the same angle to the line of centers of the holes 44 and the longitudinal axis of the base 22 when mounted thereon.

In Fig. V, the bearing bracket 32 is mounted on the face of the base 22 and the pinion 35 is in mesh with the side teeth 37 of the rack plate 27.

In Fig. VI, the base 22 is mounted on its face with the shaft 10 extending vertically. In order to maintain the shaft 10 in a vertical position, and to mount the base 22 at the proper angle to shift the pulley 11 when it is moved along the base 22, two wedge-shaped base spacers 46 and 47 are mounted between the face of the base 22 and the mounting bracket 43.

In Fig. V, there is shown attached to the transmission, a universal speed scale which is necessitated by the universality of the mounting bracket and the transmission base. This speed scale consists of a tube 48 (Fig. VII), having an annular flange 49 in which is cut a groove 50. The tube 48 is mounted in a bracket 51 and held therein by a set screw 52, which extends into the groove 50. The tube 48 has a plurality of longitudinal apertures 53 cut in its walls, and, marked on the outer surface of the tube, are scales 54, in various terms, one for each of the apertures 53. The tube 48 is rotatable within the bracket 51 and thus the desired scale 54 and corresponding aperture 53 may be moved into line with an indicating arrow or arrows 55 marked on the periphery of a plunger 56 slidable within the tube 48. The plunger 56 is attached to one end of a Bowden wire cable 57, the other end of which is attached to the base 22 (Fig. V) and the rack plate 27. Thus the variable scale may be mounted in any position relative to the transmission and the movement of the rack plate 27 will be reflected by the indicating plunger 56 to show the change in speed in terms of whichever of the scales 54 is turned to view.

The embodiment of the invention that has been disclosed may be modified to meet various requirements.

Having described my invention, I claim:

1. In a device of the class described, in combination, a base having oppositely directed elongated faces and edges, a shaft translatably mounted on said base for movement in a direction oblique to its axis, means for moving said shaft including a slide movable in said base and having a set of rack teeth in one of its faces, said teeth extending to an edge of a face of said slide and a set of rack teeth in the side of said slide adjacent such edge, a control shaft bearing bracket mountable on said base adjacent the path of movement of said slide on either side of either face of said base and on either edge of said base and a control shaft upon which is fixed a pinion engageable in either of said sets of rack teeth, said control shaft being mountable in said bearing bracket to extend perpendicularly from the plane of said base in either direction and on either side of said base and to extend parallelly to the plane of said base and perpendicularly to its edges in either direction and on either side of said base, a composite dual sheave pulley journaled by said translatably movable shaft and engageable by a driving and driven belt, said shaft being removably mounted on said slide and adapted to extend from either side of said base, and means for clamping said slide in a selected position.

2. In a device of the class described, in combination, a rectilinear base, a shaft translatably mounted on said base for movement in a direction oblique to its axis, means for moving said shaft including a slide movable in said base and having a set of rack teeth in one of its faces, said teeth extending to an edge of such face and a set of rack teeth in the side of said slide adjacent such edge, a control shaft bearing bracket mountable on said base adjacent the path of movement of said slide on either side of either face of said base and on either edge of said base and a control shaft upon which is fixed a pinion engageable in either of said sets of rack teeth, a composite dual sheave pulley journaled by said translatably movable shaft and engageable by a driving and a driven belt, said shaft being removably mounted on said slide and adapted to extend from either side of said base, and means for clamping said slide in a selected position.

3. In a device of the class described, in combination, a rectilinear base, a shaft translatably mounted on said base for movement in a direction oblique to its axis, means for moving said shaft including a slide movable in said base and having a set of rack teeth in one of its faces, said teeth extending to an edge of such face and a set of rack teeth in the side of said slide adjacent such edge, a control shaft bearing bracket mountable on said base adjacent the path of movement of said slide on either side of either face of said base and on either edge of said base and a control shaft carrying a pinion engageable in either of said sets of rack teeth, a composite duel sheave pulley rotatably journaled by said shaft and engageable by a driving and a driven belt, said shaft being removably mounted on said slide and adapted to extend from either side of said base, said translatably movable shaft extending through said slide to that side of said slide opposite from said composite dual sheave pulley, and a clamping and locking member attached to the end of said translatably movable shaft and acting against said slide to lock said slide in a selected position in said base.

4. In a device of the class described, in combination, a composite dual sheave pulley for changing the speed ratio between a driving and a driven belt, each engaged in a sheave of said pulley, a base, a shaft translatably mounted on said base for movement in a direction oblique to its axis, a slide movable in said base for moving said shaft, variably positionable means for moving said slide, said pulley being journaled by said shaft and mounted on one end of said shaft, said shaft being removably mounted on said slide and adapted to extend from either side of said base, said translatably movable shaft extending through said slide to that side of said slide opposite from said composite dual sheave pulley, and a clamping and locking member attached to the end of said translatably movable shaft and acting against said slide to lock said slide in a selected position in said base.

5. In a variable speed transmission of the type comprising a composite dual sheave pulley for changing the speed ratio between a driving and a driven belt each engaged in a sheave of said pulley, a substantially rectilinear base, a shaft translatably mounted on said base for movement in a direction oblique to its axis by which said composite dual sheave pulley is journaled, variably positionable means for moving said shaft including a control shaft adapted to be mounted in said means to extend from either side of said base or from either face of said base, the ends of said base being cut at an angle with relation to the face of said base complementary to the angle between the direction of movement of said shaft and the axis of said shaft when mounted in said base, said base being mountable upon either of its ends, and means for mounting said base on either edge thereof or on either face thereof including a bracket usable alone for mounting said base on either of its edges and spacers usable with said bracket for mounting said base on either of its faces.

6. In a variable speed transmission of the type comprising a composite dual sheave pulley for changing the speed ratio between a driving and a driven belt each engaged in a sheave of said pulley, a substantially rectilinear base having oppositely directed faces and edges, a shaft translatably mounted on said base for movement in a direction oblique to its axis by which said composite dual sheave pulley is journaled, variably positionable means for moving said shaft including a control shaft adapted to be mounted to extend from either side of said base or from either face of said base, and means for mounting said base on either of its edges or on either of its faces, including a bracket usable alone for mounting said base on either of its edges and spacers usable with said bracket for mounting said base on either of its faces.

7. In a variable speed transmission of the type comprising a composite dual sheave pulley for changing the speed ratio between a driving and a driven belt each engaged in a sheave of said pulley, a substantially rectilinear base having oppositely directed faces and edges, a shaft translatably mounted on said base for movement in a direction oblique to its axis by which said composite dual sheave pulley is journaled, variably positionable means for moving said shaft including a control shaft adapted to be mounted to extend from either side of said base or from either face of said base, and means for mounting said base on either of its edges or on either of its faces, including a bracket usable alone for mounting said base on either of its edges and spacers usable with said bracket for mounting said base on either of its faces, said bracket having mounting slots bearing the same angular relation to said base when mounted on edge on said bracket as the angle between said base and a plane perpendicular to the axis of said translatably movable shaft, said spacers being adapted to be located between one face of said base and said bracket and to hold said base and said bracket in an angular relation equal to such angle between said base and such plane perpendicular to the axis of said translatably movable shaft.

8. In a device of the class described, in combination, a base shaped substantially like the frustum of a wedge each of its faces being substantially rectangular and having a longitudinally extending channel therein, said base having a slot extending between said channels, a slide movable in either of said channels, a set of rack teeth in one face of said slide adjacent one of its edges and another set of rack teeth in the side of said slide adjacent such edge, a bearing bracket adapted to be secured to said base at either side of either of its faces and on either of its edges, a pinion engageable in either of said sets of rack teeth and secured to a control shaft mounted in said bracket, a jackshaft removably mounted on said slide and adapted to project from either face thereof, a composite dual sheave pulley rotatably journaled by said jackshaft, said jackshaft extending through the slot in said base and through said slide, and clamping means for holding said slide and said jackshaft in an adjusted position on said base.

9. In a device of the class described, in combination, a base shaped substantially like the frustum of a wedge each of the faces being substantially rectangular and having a longitudinally extending channel therein, said base having a slot extending between said channels, a slide movable in either of said channels, a set of rack teeth in one face of said slide adjacent one of its edges and another set of rack teeth in the side of said slide adjacent such edge, a bearing bracket adapted to be secured to said base at either side of either of its faces and on either of its edges, a pinion engageable in either of said sets of rack teeth and secured to a control shaft mounted in said bracket, a jackshaft removably mounted on said slide and adapted to project from either face thereof, an angularly bored bushing removably mounted in said slide for mounting said jackshaft on said slide, one face of said bushing being at right angles to the axis of said jackshaft and the other face of said bushing being parallel to the direction of movement of said jackshaft, a composite dual sheave pulley rotatably journaled by said jackshaft, said jackshaft extending through the slot in said base and through said slide, and clamping means for holding said slide and said jackshaft in adjusted position on said base.

10. In a variable speed transmission, in combination, a composite dual sheave pulley for changing the speed ratio between a driving and a driven belt each engaged in a sheave of said pulley, a base, a shaft translatably mounted on said base for movement in a direction oblique to its axis, said composite pulley being journaled on said shaft, and means for mounting said shaft on said base and for moving said shaft including a linearly movable slide and an angularly bored bushing mountable in said slide for removably mounting said translatably movable shaft, one face of said bushing being at right angles to the axis of said shaft and the other face of said bushing being parallel to the direction of movement of said shaft, said shaft being mountable in said bushing on said slide with said pulley on either side of said base.

11. In a device of the class described, in combination, a base shaped substantially like the frustum of a wedge each of its faces being substantially rectangular and having a longitudinally extending channel therein, said base having a slot extending between said channels, a slide movable in either of said channels, a set of rack teeth in one face of said slide adjacent one of its edges and another set of rack teeth in the side of said slide adjacent such edge, a bearing bracket adapted to be secured to said base at either side of either of its faces and on either of its edges, a pinion engageable in either of said sets of rack teeth and secured to a control shaft mounted in said bracket, a jackshaft removably mounted on said slide and adapted to project from either face thereof, a composite dual sheave pulley rotatably journaled on said jackshaft, said jackshaft extending through the slot in said base and through said slide, and an adjustable clamp attached to that end of said jackshaft extending through said slide opposite from said dual sheave pulley and acting against said slide to clamp said slide and jackshaft in a selected position.

12. A universally mountable variable speed transmission comprising a composite dual sheave pulley for changing the speed ratio between a driving and a driven belt each engaged in one of said sheaves, a shaft translatably movable in a direction oblique to its axis by means of which said pulley is journaled, said shaft being adapted to extend from either of two opposite sides of said base and means for mounting and moving said translatably movable shaft having a control shaft adapted to extend in any one of four directions on a plane parallel to the axis of said shaft in any one of eight positions from said base.

FOSTER V. WALTZ.